US009568786B2

United States Patent
Zhang et al.

(10) Patent No.: US 9,568,786 B2
(45) Date of Patent: Feb. 14, 2017

(54) ARRAY SUBSTRATE WITH MULTIPLE COMMON LINES, LIQUID CRYSTAL DISPLAY AND CONTROL METHOD THEREOF

(71) Applicant: Shanghai Tianma Micro-Electronics Co., Ltd., Shanghai (CN)

(72) Inventors: Chengfeng Zhang, Shanghai (CN); Yuan Li, Shanghai (CN); Jinjin Yang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 20 days.

(21) Appl. No.: 14/137,945

(22) Filed: Dec. 20, 2013

(65) Prior Publication Data
US 2014/0104525 A1    Apr. 17, 2014

Related U.S. Application Data

(63) Continuation of application No. PCT/CN2012/085922, filed on Dec. 5, 2012.

(30) Foreign Application Priority Data

Jul. 13, 2012  (CN) .......................... 2012 1 0244083

(51) Int. Cl.
  *G02F 1/1343*  (2006.01)
  *G09G 3/36*  (2006.01)
(52) U.S. Cl.
  CPC ....... *G02F 1/134363* (2013.01); *G09G 3/3648* (2013.01); *G09G 3/3655* (2013.01);
  (Continued)

(58) Field of Classification Search
CPC .. G02F 1/34363; G09G 3/3648; G09G 3/3655
(Continued)

(56) References Cited

U.S. PATENT DOCUMENTS

| 2002/0044113 A1 | 4/2002 | Ishiyama |
| 2006/0208985 A1 | 9/2006 | Hwang et al. |

(Continued)

FOREIGN PATENT DOCUMENTS

| CN | 1115535 A | 1/1996 |
| CN | 101097696 A | 1/2008 |

(Continued)

OTHER PUBLICATIONS

Extended European Serch Report for European Application No. 12880905.0, mailed on May 6, 2015, 11 pages total.

(Continued)

*Primary Examiner* — Chanh Nguyen
*Assistant Examiner* — Daniel Duong
(74) *Attorney, Agent, or Firm* — Alston & Bird LLP (57) ABSTRACT

An array substrate, a liquid crystal display and a control method thereof are disclosed. The array substrate includes scanning lines, data lines, pixel units, and common lines. Each common line is disposed along a row of pixel units. The array substrate also includes a common voltage supply line, and dual-channel selection switches each having an output terminal connected to a set of common lines, two input terminals connected to a common voltage high level supply line and a common voltage low level supply line respectively to selectively apply a high level or a low level to the common lines, thereby avoiding delay of the common voltage Vcom and the Vcom drift during a display mode and improving the display effect for an image.

17 Claims, 5 Drawing Sheets

(52) U.S. Cl.
CPC ............... *G09G 2300/0876* (2013.01); *G09G 2310/0218* (2013.01); *G09G 2310/08* (2013.01)

(58) Field of Classification Search
USPC .......................................................... 349/41
See application file for complete search history.

(56) References Cited

U.S. PATENT DOCUMENTS

| | | |
|---|---|---|
| 2007/0057887 A1 | 3/2007 | Itakura et al. |
| 2008/0106541 A1 | 5/2008 | Yamazaki |
| 2008/0238843 A1 | 10/2008 | Yatabe |
| 2009/0128527 A1 | 5/2009 | Itakura et al. |

FOREIGN PATENT DOCUMENTS

| | | |
|---|---|---|
| CN | 101154004 A | 4/2008 |
| GB | 2117970 A | 10/1983 |
| JP | 2009205097 A | 9/2009 |
| JP | 2009210674 A | 9/2009 |
| JP | 2009205096 A | 10/2009 |

OTHER PUBLICATIONS

Office Action as issued in corresponding Chinese Application No. 201210244083.X, dated Jul. 23, 2015, and English-language summary thereof.

ARRAY SUBSTRATE WITH MULTIPLE COMMON LINES, LIQUID CRYSTAL DISPLAY AND CONTROL METHOD THEREOF

CROSS REFERENCE TO RELATED APPLICATIONS

This application claims priority to and is a continuation of PCT/CN2012/085922 filed on Dec. 5, 2012, which claims the benefit of Chinese Patent Application No. 201210244083.X, entitled "ARRAY SUBSTRATE, LIQUID CRYSTAL DISPLAY AND CONTROL METHOD THEREOF", filed with the State Intellectual Property Office of People's Republic of China on Jul. 13, 2012, the contents of which are incorporated herein by reference in their entirety.

TECHNICAL FIELD

The invention relates to the field of liquid crystal display, and in particular to an array substrate, a liquid crystal display and a control method thereof.

BACKGROUND OF THE INVENTION

Figure 1:
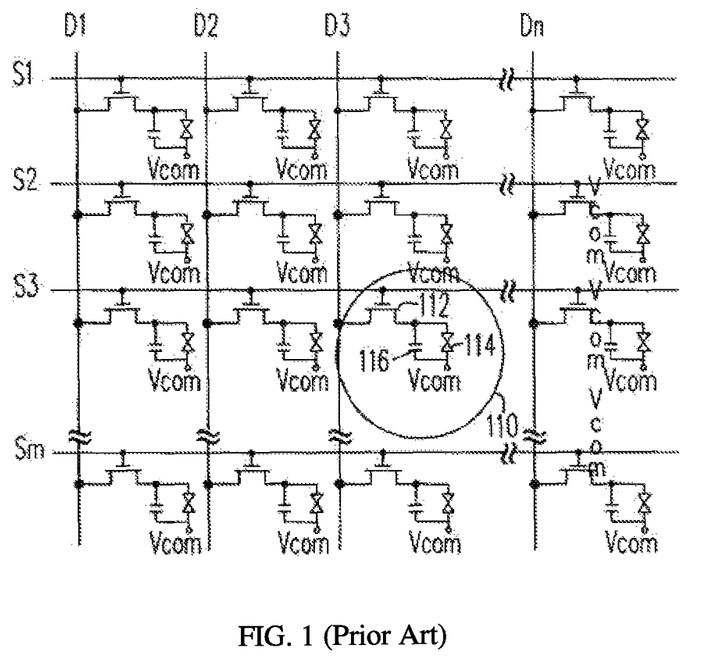
FIG. 1 is an equivalent circuit diagram of a liquid crystal display in the prior art.

Liquid Crystal Display (LCD) devices are widely used in flat-panel displays. A conventional LCD device is a Thin Film Transistor Liquid Crystal Display (simply referred to as TFT-LCD). A Thin Film Transistor (TFT) includes an amorphous-Silicon Thin Film Transistor (a-Si TFT) and a Poly-Silicon Thin Film Transistor (Poly-Si TFT). Furthermore, the Poly-Silicon Thin Film Transistors includes Low Temperature Poly-silicon (referred to as LTPS) TFT-LCDs and High Temperature Poly-silicon (referred to as HTPS) TFT-LCDs. Specifically, the TFT-LCDs in the prior art are referred to as the a-Si TFT-LCDs. The circuit diagram of the internal structure of a TFT-LCD is shown in FIG. 1, and the structure will be described as follows.

Multiple scanning lines 51 to Sm parallel to each other and multiple data lines D1 to Dn parallel to each other are disposed on the array substrate of the TFT-LCD. The scanning lines are arranged to intersect with the data lines and pixel units 110 are disposed at the intersections of the scanning lines and the data lines to form a pixel unit array. The pixel unit 110 includes a transistor 112 of which the gate is connected to a corresponding scanning line, the source of the transistor 112 is connected to a corresponding data line and the drain of the transistor 112 is coupled to a common voltage Vcom via a pixel element 114. Specifically, a storage capacitor 116 connected across the pixel element 114 to stabilize the voltage across the pixel element 114.

When an image is displayed by the TFT-LCD, a scanning signal is transmitted to the scanning lines to turn on a transistor connected to each of the scanning lines. Then, a data signal is sequentially applied to the pixel units 110, and the storage capacitor 116 will be charged upon the data signal is transmitted from the source to the drain of transistor 112. Meanwhile, the common voltage Vcom is applied to the other end of the pixel element 114, since Vcom is different from the voltage of the drain of the transistor, the voltage difference is formed between the two ends of the pixel element 114, and thus the pixel element 114 is lit up.

On the array substrate of the TFT-LCD, the common voltage is applied to the whole substrate, therefore, when one pixel unit is driven, the common voltage is applied to the whole substrate simultaneously. That is, the load driven by the common voltage Vcom may be all the pixel units on the array substrate, so that the common voltage Vcom may not have sufficient drive capability.

Figure 2:
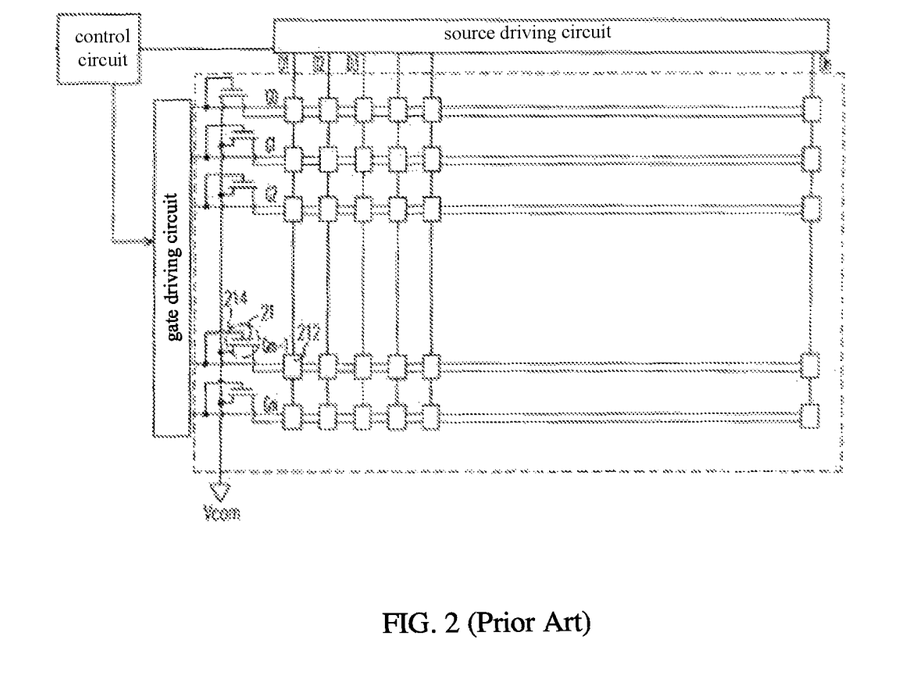
FIG. 2 is an equivalent circuit diagram of another liquid crystal display in the prior art.

In order to solve the problem, the solution according to the prior art is shown in FIG. 2. One common line is disposed for each row of pixel units, and a common voltage is applied to the pixel units via the common line. The common line is connected to a corresponding scanning line via a transistor 21. Here, the gate of the transistor 21 is connected to the corresponding scanning line, and the drain of the transistor 21 is connected to the common line, and the sources of all the transistors 21 on the array substrate are connected to a terminal from which the common voltage is supplied.

During display of an image, transistors within a row of pixel units and the transistor 21 connected to the corresponding common line are turned on simultaneously by a scanning signal, thus the common voltage is applied to the pixel units row by row, the load for the common voltage is reduced and the drive capability of Vcom is improved.

However, adopting this design will affect the quality of display due to the extremely short charging time of the pixel located away from a common voltage signal input terminal which is caused by the RC delay. Since a common electrode line has the common voltage only when the row of scanning line is turned on, the common electrode line is in a floating state at other times and can be affected by disturbance, and thus the quality of display will be deteriorated.

BRIEF SUMMARY OF THE INVENTION

Embodiments of the present invention provide an array substrate.

The array substrate includes: a plurality of scanning lines arranged in parallel to each other in a first direction, a plurality of data lines arranged in parallel to each other in a second direction, where the first direction intersects with the second direction, a plurality of pixel units disposed at intersections of the scanning lines and the data lines, a plurality of common lines, each common line is disposed along a row of pixel units and electrically connected thereto. The array substrate also includes a common voltage supply line comprising a common voltage high level supply line and a common voltage low level supply line, and a plurality of dual-channel selection switches, each of which comprises a control terminal, two input terminals and an output terminal. The output terminal is connected to a set of common lines, the two input terminals of the dual-selection switch are connected to the common voltage high level supply line and the common voltage low level supply line respectively. A high level or a low level is selectively applied to the common lines according to a control signal supplied from the control terminal of the dual-channel selection switch. In some embodiments, the number of the common lines in the set of common lines is less than the number of the common lines in the array substrate.

According to some embodiments of the present invention, a liquid crystal display is described. The liquid crystal display includes the array substrate described above, a color film substrate disposed opposite to the array substrate, a liquid crystal layer disposed between the array substrate and the color film substrate, a gate driving circuit which is connected to the scanning lines and transmits scanning signals through the scanning lines, a source driving circuit which is connected to the data lines and transmits portions of image data through the plurality of data lines. The liquid crystal display also includes a control circuit which is coupled to the gate driving circuit and the source driving circuit respectively and controls a normal operation of the gate driving circuit and the source driving circuit; and a switching control circuit which is connected to control terminals of the dual-channel selection switches, controls connecting lines of the dual-channel selection switches, and selectively applies a high level or a low level to the common lines through outputting a control signal.

DETAILED DESCRIPTION OF THE PREFERRED EMBODIMENTS

In order to make objects, technical solutions and advantages of certain embodiments of the invention to be understood, exemplary embodiments of the invention will be described below in conjunction with the drawings. Those skilled in the art with access to the present disclosure will recognize that other display control devices and methods can also be designed within the scope of the claimed invention.

Figure 3:
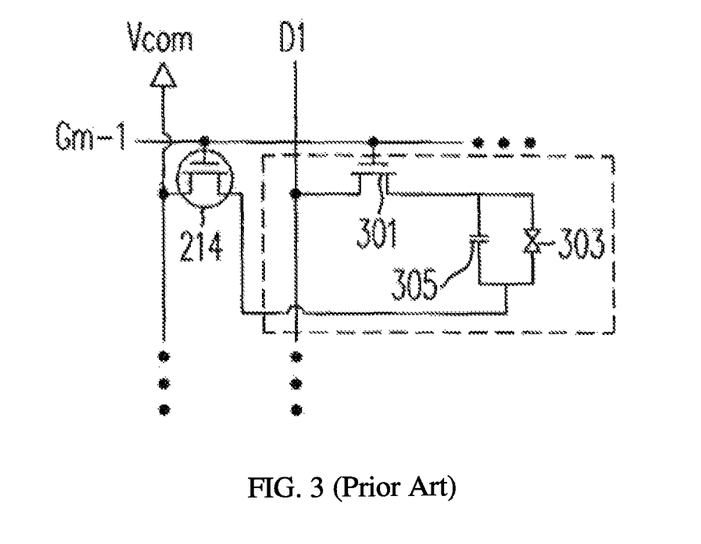
FIG. 3 is an equivalent circuit diagram of a pixel unit in the prior art.

As described above, the display effect of conventional liquid crystal display (LCD) devices is poor. The inventors discovered that the main reason is in that there are delay and voltage drift during Vcom in the prior art driving a row of pixel units. It will be described further below in conjunction with FIG. 2 and FIG. 3. FIG. 3 is an internal circuit diagram of a pixel unit in FIG. 2.

After a scanning signal is applied to the (Gm-1)-th scanning line, transistors 301 and 214 are turned on simultaneously (concurrently), and a data signal is input to transistor 301 via data line D1. After transistor 301 is turned on, a first potential is applied on one end of a pixel element 303 after a short signal transmission. After transistor 214 is turned on, a common voltage is applied to the source of transistor 214 from the Vcom providing terminal, and then the common voltage is transmitted to the other end of the pixel element 303 via a transmission line, thus a voltage difference is formed between the two ends of the pixel element 303. During the transmission of the signal, although both of the data signal and the common voltage need to pass through a transistor, the common voltage needs to be transmitted to the whole row of the common lines shown in FIG. 2 as the common voltage passes the transistor 214, but the transistor 301 only needs to transmit the data signal to the inside of the pixel unit in which the transistor 301 is located. That is, the load driven by transistor 214 is much larger than transistor 301. Therefore the speed at which the signal is transmitted on the common line is slower than the speed at which the signal is transmitted inside the pixel unit, causing a delay of the signal on the common line and thus a delay in the display of pixel unit 303.

In another aspect, since the turn-on and turn-off of transistor 214 are also controlled by a scanning signal, that is, after a row of scanning signals are turned off, a corresponding common line will be in a floating state and be easily disturbed by the external environment through capacity coupling. When a voltage is applied to other rows of scanning lines and the common lines, the common line in the floating state can easily be disturbed, thus affecting the display effect.

In view of these problems, embodiments of the present invention provide an array substrate that includes: multiple scanning lines parallel to each other in a first direction; multiple data lines parallel to each other in a second direction, where the first direction intersects with the second direction, the first direction is substantially perpendicular to the second direction. The array substrate also includes multiple pixel units disposed at intersections of the scanning lines and the data lines, multiple common lines, each of which is disposed along and electrically connected to a row of pixel units, that is, each of which is electrically connected to one corresponding row of pixel units. The array substrate further includes a common voltage supply line including a common voltage high level supply line and a common voltage low level supply line; multiple dual-channel selection switches, each of which includes a control terminal, two input terminals and an output terminal, where the output terminal of each of the dual-channel selection switches is connected to a set of common lines, the two input terminals of the dual-channel selection switch are connected to the common voltage high level supply line and the common voltage low level supply line respectively, such that a high level or a low level is selectively applied to a common line through a control signal input from the control terminal, and the number of the common lines included in the set of common lines is less than the number of the common lines included in the array substrate.

In some embodiments, a liquid crystal display includes the array substrate described above. The display includes: a color film substrate disposed opposite to the array substrate and a liquid crystal layer disposed between the array substrate and the color film substrate; a gate driving circuit which is connected to the multiple scanning lines and transmits multiple scanning signals through the multiple scanning lines; a source driving circuit which is connected to the multiple data lines and transmits multiple pieces of image data through the multiple data lines. The array substrate also includes a control circuit which is coupled to the gate driving circuit and the source driving circuit and controls the normal operations of the gate driving circuit and the source driving circuit; a switching control circuit which is connected to the control terminals of the multiple dual-channel selection switches, controls the connecting lines of the multiple dual-channel selection switches and selectively applies a high level or a low level to the common lines under the control of or in response of a control signal.

In some embodiments, a control method for controlling the above-described LCD. The method includes: supplying power to a common line corresponding to a scanning line before providing a scanning signal to the scanning line, such that the pixel units connected to the scanning line have a common potential if the scanning signal is provided to the scanning line, maintaining the common potential unchanged during display of a frame of picture; and inverting the potential applied to the common line during scanning for a next frame.

According to an embodiment of the present invention, the common line corresponding to a scanning line is supplied with power before a scanning signal is provided to the scanning line, such that the pixel units connected to the scanning line already have a common potential if the scanning signal is provided to the scanning line. Therefore, each pixel element in the row of pixel elements can form a potential difference across the pixel element immediately after a transistor corresponding to the pixel element is turned on to avoid a poor display effect due to the delay of the common potential.

Furthermore, since the potentials of individual common lines are maintained unchanged during display of a frame of picture, that is, each of the common lines is not in a floating state during the whole displaying, the crosstalk among the common lines is avoided and the stability of the common voltage during the display is guaranteed. Meanwhile, since the potentials of the common lines inverts with the refreshing frequency of the pictures during the displaying, the problem of liquid crystal aging that may occur when the liquid crystal is kept in the same potential for a long time is avoided, and the normal display mode of the display is further guaranteed.

In the following the technical solutions according to embodiments of the present invention will be described in detail in conjunction with the accompanying drawings. It will be appreciated that the described embodiments are only illustrative and not restrictive. Those skilled in the art will recognize that other display control devices, systems, and methods can also be designed within the scope of the claimed invention.

Figure 4:
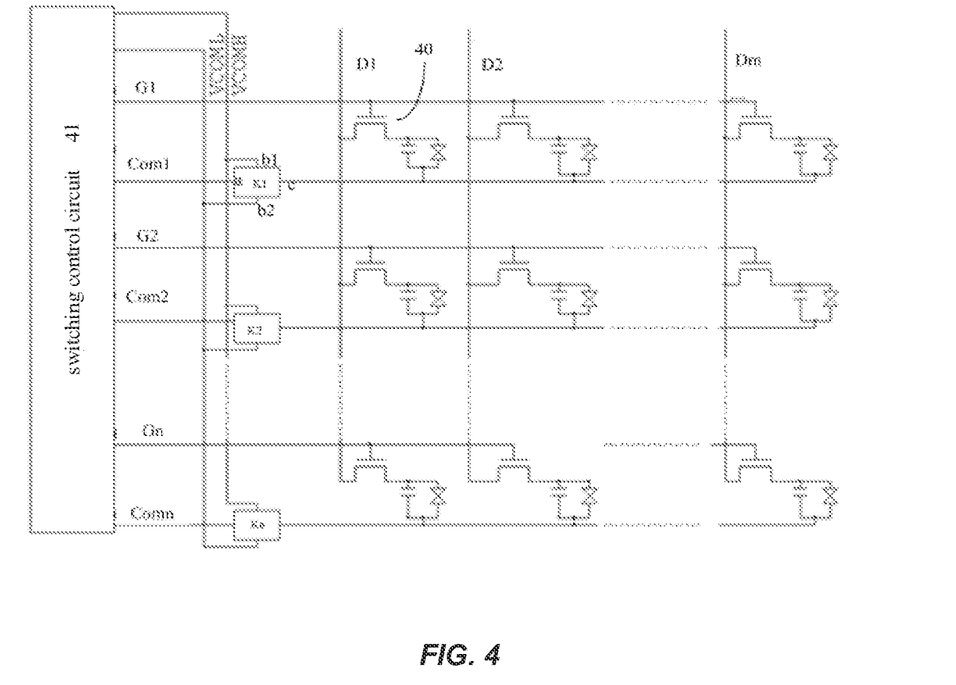
FIG. 4 is an equivalent circuit diagram of a liquid crystal display according to an embodiment of the present invention.

FIG. 4 is a circuit diagram of an array substrate according to an embodiment of the present invention. In this embodiment, the circuit diagram of the array substrate according to the embodiment of the present invention will be explained by only taking an array substrate driven by a single gate as an example.

The array substrate includes multiple scanning lines G1 to Gn parallel to each other in a first direction, multiple data lines D1 to Dm parallel to each other in a second direction, where the first direction is substantially perpendicular to the second direction; multiple pixel units 40 disposed at intersections of the scanning lines and the data lines; multiple common lines Com1 to Comn disposed along the pixel units, where one common line is disposed along a row of pixel units, and for the array substrate driven by a single gate, that is, one common line is disposed along one scanning line; a common voltage supply line including a common voltage high level supply line VcomH and a common voltage low level supply line VcomL, both of which supply a common voltage to the common lines of the entire substrate;

The array substrate also includes multiple dual-channel selection switches K1 to Kn, each of which includes a control terminal "a", two input terminals "b1" (first input terminal) and "b2" (second input terminal) respectively, and an output terminal "c". The output terminal "c" of each of dual-channel selection switches is connected to a set of common lines, and the two input terminals "1)1" and "b2" are connected to the common voltage high level supply line VcomH and the common voltage low level supply line VcomL respectively, such that a high level or a low level is selectively applied to the common line through a control signal input from the control terminal a. The control signal is preferably a clock signal in this embodiment, and the common lines are connected to different lines at different times.

It is to be noted that a set of common lines connected to a same dual-channel selection switch includes at least one common line, and the number of the common lines in the set of common lines is less than the number of the common lines included in the array substrate. Specifically, if a set of common lines includes only one common line, it is connected as shown in FIG. 4. If a set of common lines includes at least two common lines, that is, at least two common lines are connected to a same dual-channel selection switch, in this case, the common lines connected to the same dual-channel selection switch may be multiple common lines adjacent to each other, or they may also be common lines that are not adjacent to each other, or they may include common lines adjacent to each other and common lines alternate with each other.

Taking two common lines being connected to a same dual-channel selection switch K1 as an example. If the common lines adjacent to one another are connected to K1, the two common lines connected to K1 may be Com1 and Com2, or if the common lines are alternate with each other and are connected to K1, the two common lines connected to K1 may be Com1 and Com3.

Preferably, the common lines included in a set of common lines are not adjacent to one another in this embodiment. More preferably, the number of the common lines included in a set of common lines is not greater than 4. More preferably, a set of common lines includes only one common line. The following embodiments will be explained by only taking one common line being connected to one dual-channel selection switch as an example.

If one common line is connected to one dual-channel selection switch, the dual-channel selection switch K1 is taken as an example. The first input terminal "b1" of K1 is connected to VcomH, the second input terminal "b2" of K1 is connected to VcomL, the output terminal "c" of K1 is connected to Com1, and the control terminal a of K1 is connected to the switching control circuit 41 which may transmit a clock signal. The switching control circuit may be integrated with the gate driving circuit, may also be integrated with the source driving circuit, or may be integrated with a control circuit of the entire array substrate which is generally manufactured on a control chip. FIG. 4 is described by only taking the switching control circuit 41 being integrated with the gate driving circuit as an example.

Figure 5:
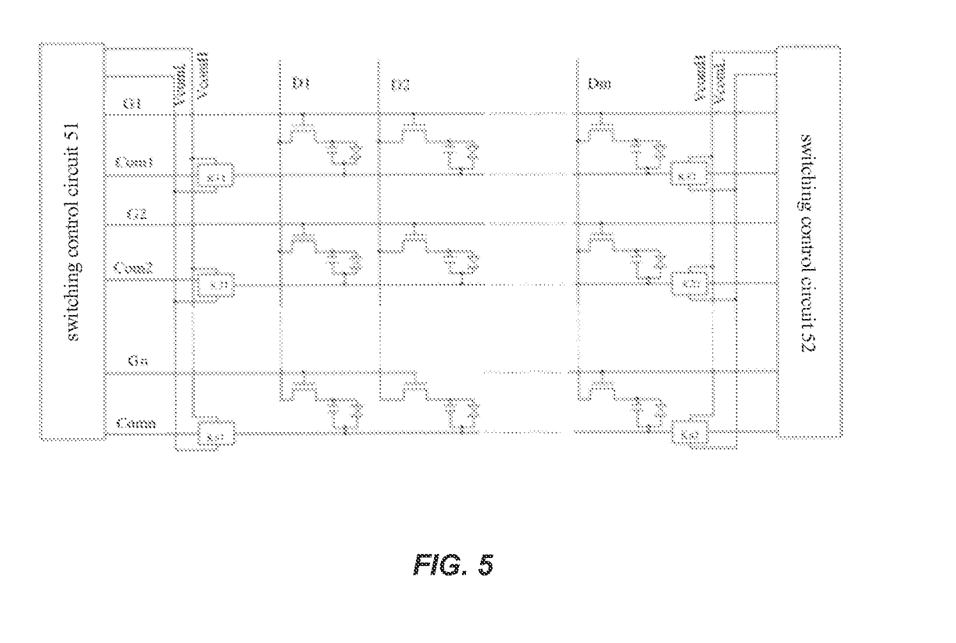
FIG. 5 is an equivalent circuit diagram of a liquid crystal display according to another embodiment of the present invention.

As shown in FIG. 5, according to other embodiments of the present invention, in order to further improve the driving capability of the common voltage, the common voltage supply lines are provided on both ends of a row of pixels, that is, the common voltage supply line includes a first common voltage supply lines 51 and a second common voltage supply lines 52 respectively, and each of them includes a common voltage high level supply line VcomH and a common voltage low level supply line VcomL. Herein, the first common voltage supply line 51 is connected to one end of the common line through a dual-channel selection switch and the second common voltage supply line 52 is connected to the other end of the common line through a dual-channel selection switch.

In other words, two dual-channel selection switches are disposed on each set of common lines, the two dual-channel selection switches are disposed on the two opposite ends of the common line respectively, and every input terminal of each of the dual-channel selection switches is connected to a common voltage supply line. If the common voltage is applied to common lines, the common voltage is applied to a set of common lines by the two common voltage supply lines on the two ends of the set of common lines simultaneously, such that the capability of the common voltage for driving loads is improved. Herein, a set of common lines includes at least one common line, and FIG. 4 and FIG. 5 are described by taking a set of common lines including one common line as an example.

It is to be noted that the voltages applied to a same common line by the two common voltage supply line on the two ends of the common line at the same time are the same, that is, the control signals applied to the two dual-channel selection switches respectively on the two ends of the common line must be the same. Preferably, the two dual-channel selection switches respectively on the two ends of the common line may be controlled by a same switching control circuit.

Based on the array substrates described above, embodiments of the present invention provide a LCD device.

The LCD includes the array substrate described in the above embodiments, a color film substrate disposed opposite to the array substrate and a liquid crystal layer disposed between the array substrate and the color film substrate; a gate driving circuit which is connected to the multiple scanning lines and transmits multiple scanning signals through the multiple scanning lines so as to control the turn-on and turn-off of a transistor in a corresponding pixel unit; and a source driving circuit which is connected to the multiple data lines and transmits multiple pieces of image data through the multiple data lines. The LCD also includes a control circuit which is coupled to the gate driving circuit and the source driving circuit and controls the normal operations of the gate driving circuit and the source driving circuit; a switching control circuit which is connected to the control terminals of the multiple dual-channel selection switches, controls the connecting lines of the multiple dual-channel selection switches and selectively inputs a high level or a low level to the common lines through outputting a control signal.

As described in the above embodiments, the switching control circuit may be integrated with the gate driving circuit in a same chip, with the source driving circuit in a same chip, or with the control circuit in a same chip. Preferably, the switching control circuit may be integrated with the gate driving circuit in this embodiment.

Figure 6:
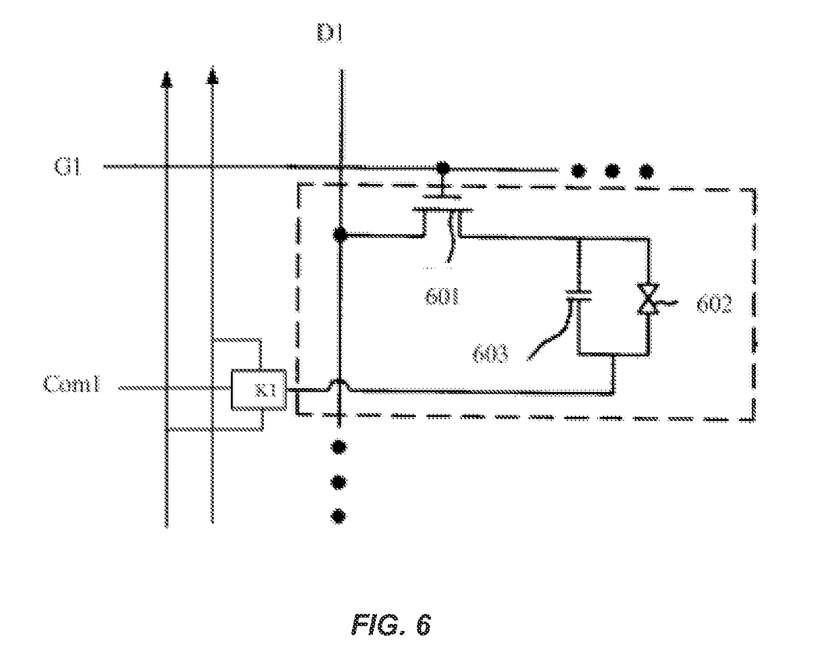
FIG. 6 is an equivalent circuit diagram of a pixel unit in a liquid crystal display according to an embodiment of the present invention.

The LCD in this embodiment may preferably be an LCD controlled by a single gate. As shown in FIG. 6, taking a pixel unit formed at the intersection of G1 with D1 as an example, the pixel unit includes: a transistor 601 of which the gate is connected to the scanning line G1 and the source is connected to the data line D1; a pixel element 602 of which one end is connected to the drain of the transistor 601 and the other end is connected to a common line Com1; and a storage capacitor 603 connected across the pixel element 602.

Figure 7:
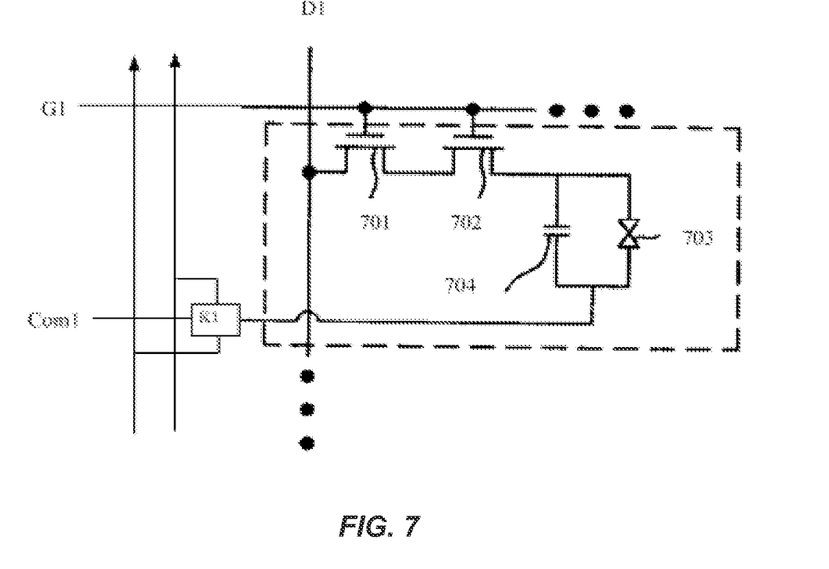
FIG. 7 is an equivalent circuit diagram of a pixel unit in a liquid crystal display according to another embodiment of the present invention.

In other embodiments, the LCD may also be an LCD controlled by a dual-gate. As shown in FIG. 7, taking a pixel unit formed at the intersection of G1 with D1 as an example, the pixel unit includes: a first transistor 701 of which the gate is connected to the scanning line G1 and the source is connected to the data line D1; a second transistor 702, the gate of the second transistor 702 is coupled to the gate of the first transistor 701, that is, the gates of the first transistor 701 and the second transistor 702 are connected to the same scanning line G1, and the source of the second transistor 702 are connected to the drain of the first transistor 701; a pixel element 703 of which one end is connected to the drain of the second transistor 702 and the other end is connected to a common line Com1; and a storage capacitor 704 connected across the pixel element 703.

Herein, regardless of that an LCD is controlled by a single gate or a dual-gate, the transistors included in the pixel units, that is, the transistor 601 in FIG. 6, the first transistor 701 and the second transistor 702 in FIG. 7 may be an a-Si TFT (amorphous-silicon thin film transistor), or a LTPS (low temperature poly-Silicon thin film) transistor or a HTPS (high temperature poly-silicon thin film) transistor.

The above-described pixel element may include a pixel electrode in the pixel area and liquid crystal molecules in the control area of the corresponding pixel electrode. The LCD in this embodiment may preferably be a LCD of a flat panel electric field mode in which the common lines are manufactured on the array substrate, and may include LCDs of IPS, FFS and AFFS driving modes.

There are two formation modes of the storage capacitor in this embodiment. One mode is that a storage capacitor is formed by one of a row of pixel electrodes overlapping with a common line corresponding to the row of pixel electrodes, and the other mode is that a storage capacitor is formed by one of a row of the pixel electrodes overlapping with both of a scanning line corresponding to the last row of pixel electrodes and a common line corresponding to the current row of pixel electrodes.

Based on the above structure, a control method for an LCD is disclosed according to another embodiment of the present invention. The control method is applied to the LCD described in the above embodiments. The control method includes:

Step 1: supplying power to a common line corresponding to a scanning line before providing a scanning signal to the scanning line, such that the pixel units connected to the scanning line have a common potential if a scanning signal is provided to the scanning line, and maintaining the potential of the common line unchanged during display of a frame of picture.

In other words, the common line connected to a pixel unit to be turned on is charged in advance to guarantee that the common voltage has been applied on one end of the pixel element when the transistor in the pixel unit is turned on. Therefore, the row of pixel elements may form potential differences across the pixel elements immediately after the corresponding transistors are turned on to avoid the delay of the common voltage.

Further, since the potential of each of the common lines is maintained unchanged during display of one frame of pictures, that is, during the display mode, each of common lines is not in a floating state. In other words, during displaying a frame of picture, the potential of each common line is stable and the potential does not change, thus the crosstalk among the common lines of individual rows is avoided and the stability of the common voltage during the displaying is guaranteed.

Step 2: inverting the potentials applied to the common lines during scanning for the next frame.

Since the potentials of the common lines are inverted with the refresh frequency of the pictures during the display mode, the problem of liquid crystal aging that occurs when the liquid crystal is controlled in the same potential for a long time can be avoided, and the normal display of the display device is further guaranteed.

Theoretically, in order to avoid the delay of the common voltage, it only needs to apply the common voltage to one end of each of the pixel elements before the transistors in each row of pixel units is turned on. In other words, all the common lines on the entire array substrate can be charged in advance and the potentials of the common lines can be substantially the same. But in this embodiment, in order to avoid that the load on the common voltage supplying terminal is excessively large which may cause the charging time of the common lines to be excessively long, it is preferred that only some of common lines may be charged at the same time. It is more preferred that 1 to 4 common lines may be charged simultaneously. It is more preferred that one dual-channel selection switch is connected to only one common line, that is, only one common line is charged at the same time, as shown in FIG. 4 and FIG. 5.

Furthermore, in order to avoid that the charging of a common line is not synchronized with the charging of a scanning line, that is, during the charging of a scanning line, it begins to charge a common line, which may cause the crosstalk among the lines. Therefore, in the embodiment, it is preferred that the charging onset timing of the common line is the same as the onset timing of supplying a scanning signal to a scanning line, that is, it begins to supply power to the common line and the scanning line simultaneously, herein, the common line is not in the row corresponding to the scanning line.

Figure 8:
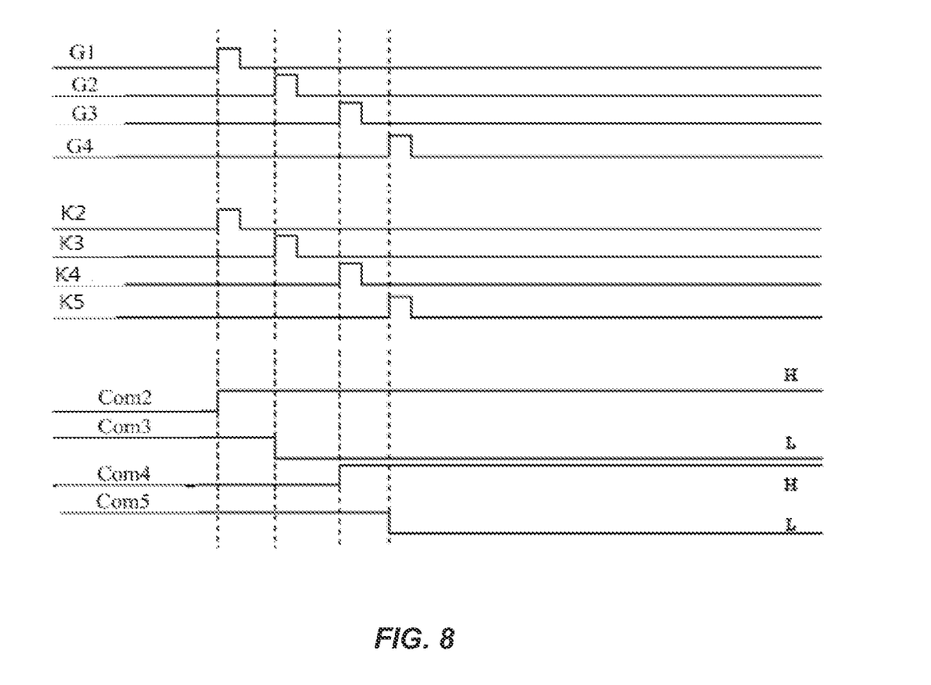
FIG. 8 and FIG. 9 are schematic diagrams of power supply modes of the common line during the displaying of two adjacent frames in a control method for a liquid crystal display according to an embodiment of the present invention.
Figure 9:
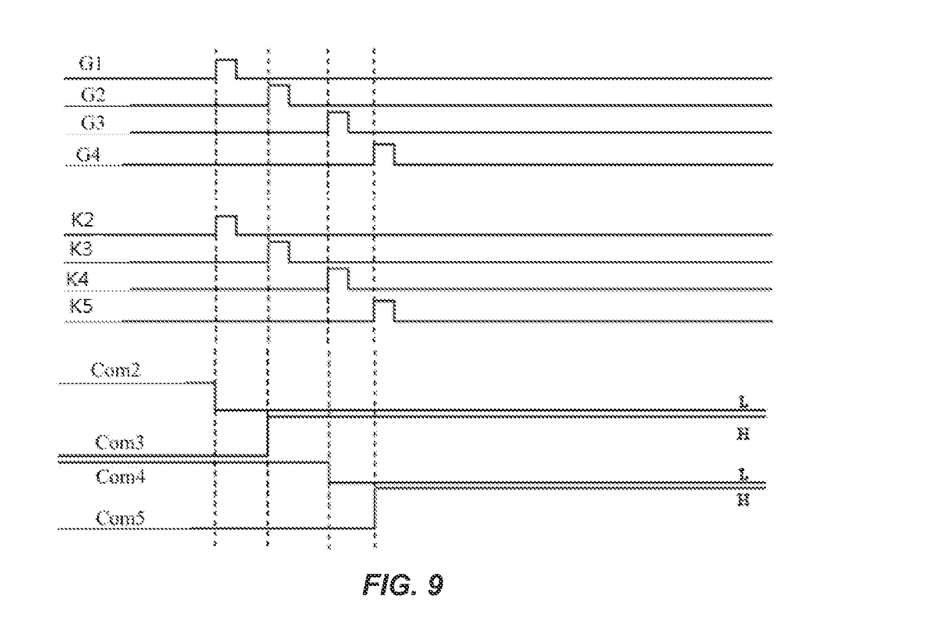

For example, in this embodiment, in the case where the number of the scanning lines is the same as the number of the common lines, that is, there are n scanning lines and n common lines on the array substrate of the LCD. Preferably, during display of a frame of picture, the supplying power onset timing for the n-th common line is the supplying power onset timing for the (n−4)-th to the (n−1)-th scanning lines. It is more preferred that the n-th common line and the (n−1)-th scanning line are supplied with power simultaneously. As shown in FIG. 8 and FIG. 9, the control signal received by the dual-channel selection switch K2 is synchronized with the scanning signal received by the scanning line G1, the control signal received by the dual-channel selection switch K3 is synchronized with the scanning signal received by the scanning line G2, and so on, thus the charging time of Com2 is the same as the charging time of the pixel unit connected to G1, the charging time of Com3 is the same as the charging time of the pixel unit connected to G2, and so on.

Theoretically, the potentials for charging all the common lines on the array substrate during display of a frame of picture may be the same, and the potentials of the common lines are inverted during scanning for the next frame. In this embodiment, in order to further reduce the load of the common voltage supplying terminal, it is preferred that some of common lines are supplied with a high potential and other common lines are supplied with a low potential. In this embodiment, it is more preferred that the potentials of two adjacent common lines are contrary to each other during displaying a frame of picture as shown in FIG. 8, and a potential contrary to that of the last frame is applied to the common lines during the scanning for the next frame as shown in FIG. 9.

Another control method for an LCD is disclosed according to another embodiment of the present invention. The control method is applied to the LCD with two common voltage supply lines. In this embodiment, the specific way for supplying power to the common lines is: at the same time, the two ends of one common line are connected to a same potential supply line of the first common voltage supply line and the second common voltage supply line respectively via the two dual-channel selection switches located at the two ends of the common line, and the common line is supplied with power by the first common voltage supply line and the second common voltage supply line simultaneously, thus the capability of the common voltage supplying terminal for driving the common line is further improved and the driving time of the common line is further shortened.

According to the description for the disclosed embodiments, those skilled in the art may implement or use the invention. A number of modifications to those embodiments will be apparent to those skilled in the art, and the general principles defined herein may be realized in other embodiments without departing from the scope and spirit of the invention. Therefore, the invention is not limited to the above-described embodiments, but the invention can also be enforced in other various modified embodiments.

What is claimed is:

1. An array substrate, comprising:
   a plurality of scanning lines parallel to one another in a first direction;
   a plurality of data lines parallel to one another in a second direction, wherein the first direction intersects with the second direction;
   a plurality of pixel units disposed at intersections of the scanning lines and the data lines;
   a plurality of common lines, each arranged along and electrically connected to a row of pixel units;
   a common voltage supply line comprising a common voltage high level supply line and a common voltage low level supply line; and
   a plurality of dual-channel selection switches, each of which comprises one control terminal, two input terminals and one output terminal, wherein the output terminal of each of the dual-channel selection switches is connected to one of the common lines, the two input terminals of the dual-channel selection switch are connected to the common voltage high level supply line and the common voltage low level supply line respectively, a high level or a low level is selectively applied to the common lines sequentially for frames of display according to a control signal supplied from the control terminal of the dual-channel selection switch;
   wherein voltage changes are generated sequentially with delays from one common line associated with one frame of display to a next common line associated with the next frame, wherein each of common lines is completely inverse as the starting time of a frame to an adjacent frame.

2. The array substrate according to claim 1, wherein the common voltage supply line comprises a first common voltage supply line and a second common voltage supply line, each of which comprises a common voltage high level supply line and a common voltage low level supply line; and wherein the first common voltage supply line is connected to one end of the common line through a dual-channel selection switch, and the second common voltage supply line is connected to the other end the common line through a dual-channel selection switch.

3. The array substrate according to claim 2, wherein the control signal is a clock signal.

4. The array substrate according to claim 1, wherein the control signal is a clock signal.

5. The array substrate according to claim 1, wherein a charging onset timing of one common line is the same as an onset timing of supplying a scanning signal to one scanning line.

6. A liquid crystal display, comprising:
an array substrate comprising:
a plurality of scanning lines parallel to one another in a first direction;
a plurality of data lines parallel to one another in a second direction, wherein the first direction intersects with the second direction;
a plurality of pixel units disposed at intersections of the scanning lines and the data lines;
a plurality of common lines, each arranged along and electrically connected to a row of pixel units;
a common voltage supply line comprising a common voltage high level supply line and a common voltage low level supply line; and
a plurality of dual-channel selection switches, each of which comprises one control terminal, two input terminals and one output terminal, wherein the output terminal of each of the dual-channel selection switches is connected to one of the common lines, the two input terminals of the dual-channel selection switch are connected to the common voltage high level supply line and the common voltage low level supply line respectively, a high level or a low level is selectively applied to the common lines sequentially for frames of display according to a control signal supplied from the control terminal of the dual-channel selection switch, wherein voltage changes are generated sequentially with delays from one common line associated with one frame of display to a next common line associated with the next frame, wherein each of common lines is completely inverse as the starting time of a frame to an adjacent frame;
a color film substrate disposed opposite to the array substrate and a liquid crystal layer disposed between the array substrate and the color film substrate;
a gate driving circuit which is connected to the scanning lines and transmits scanning signals through the scanning lines;
a source driving circuit which is connected to the data lines and transmits pieces of image data through the data lines;
a control circuit which is coupled to the gate driving circuit and the source driving circuit and controls a normal operation of the gate driving circuit and the source driving circuit; and
a switching control circuit which is connected to control terminals of the dual-channel selection switches, controls connecting lines of the dual-channel selection switches and selectively applies a high level or a low level to the common lines through outputting a control signal.

7. The liquid crystal display according to claim 6, wherein the switching control circuit is integrated with the gate driving circuit, the source driving circuit, or the control circuit.

8. The liquid crystal display according to claim 6, wherein the pixel unit comprises:
a transistor, the gate of which is connected to the scanning line and the source is connected to the data line;
a pixel element, one end of which is connected to the drain of the transistor and the other end is connected to the common line; and
a storage capacitor connected across the pixel element.

9. The liquid crystal display according to claim 8, wherein the transistor is an amorphous-silicon thin film transistor, a low temperature poly-silicon thin film transistor, or a high temperature poly-silicon thin film transistor.

10. The liquid crystal display according to claim 6, wherein the pixel unit comprises:
a first transistor, the gate of which is connected to the scanning line and the source is connected to the data line;
a second transistor, the gate of which is coupled to the gate of the first transistor and the source is coupled to the drain of the first transistor;
a pixel element, one end of which is connected to the drain of the second transistor and the other end is connected to the common line; and
a storage capacitor connected across the pixel element.

11. The liquid crystal display according to claim 10, wherein the transistor is an amorphous-silicon thin film transistor, a low temperature poly-silicon thin film transistor, or a high temperature poly-silicon thin film transistor.

12. The liquid crystal display according to claim 6, wherein a charging onset timing of one common line is the same as an onset timing of supplying a scanning signal to one scanning line.

13. A control method for a liquid crystal display, which is applied to a liquid crystal display comprising:
an array substrate comprising:
a plurality of scanning lines parallel to one another in a first direction;
a plurality of data lines parallel to one another in a second direction, wherein the first direction intersects with the second direction;
a plurality of pixel units disposed at intersections of the scanning lines and the data lines;
a plurality of common lines, each arranged along and electrically connected to a row of pixel units;
a common voltage supply line comprising a common voltage high level supply line and a common voltage low level supply line; and
a plurality of dual-channel selection switches, each of which comprises one control terminal, two input terminals and one output terminal, wherein the output terminal of each of the dual-channel selection switches is connected to one of the common lines, the two input terminals of the dual-channel selection switch are connected to the common voltage high level supply line and the common voltage low level supply line respectively, a high level or a low level is selectively applied to the common lines sequentially for frames of display according to a control signal supplied from the control terminal of the dual-channel selection switch;
wherein voltage changes are generated sequentially with delays from one common line associated with one frame of display to a next common line associated with the next frame, wherein each of common lines is completely inverse as the starting time of a frame to an adjacent frame;
a color film substrate disposed opposite to the array substrate and a liquid crystal layer disposed between the array substrate and the color film substrate;
a gate driving circuit which is connected to the scanning lines and transmits scanning signals through the scanning lines;
a source driving circuit which is connected to the data lines and transmits pieces of image data through the data lines;

a control circuit which is coupled to the gate driving circuit and the source driving circuit and controls a normal operation of the gate driving circuit and the source driving circuit; and a switching control circuit which is connected to control terminals of the dual-channel selection switches, controls connecting lines of the dual-channel selection switches and selectively applies a high level or a low level to the common lines through outputting a control signal;

wherein the control method comprises:

supplying power to a common line corresponding to a scanning line before providing a scanning signal to the scanning line, such that pixel units connected to the scanning line have a common potential in the case that a scanning signal is provided to the scanning line, and maintaining the potential of the common line unchanged during displaying a frame of picture; and inverting the potential applied to the common line during scanning for a next frame.

14. The control method according to claim 13, wherein the n-th common line and the (n−1)-th scanning line are supplied with power simultaneously.

15. The control method according to claim 14, wherein the potentials of two common lines adjacent to each other are contrary to each other during displaying a frame of picture.

16. The control method according to claim 13, wherein the way for supplying power to a common line comprises: the two ends of the common line are respectively connected to a same potential supply line of the first common voltage supply line and the second common voltage supply line through two dual-channel selection switches located at the two ends of the common line, and the common line is supplied with power by the first common supply line and the second common voltage supply line simultaneously.

17. The control method for a liquid crystal display according to claim 13, wherein a charging onset timing of one common line is the same as an onset timing of supplying a scanning signal to one scanning line.

* * * * *